US007428862B2

(12) United States Patent
Rateick, Jr.

(10) Patent No.: US 7,428,862 B2
(45) Date of Patent: Sep. 30, 2008

(54) CLADDED AXIAL MOTOR/PUMP PISTON AND METHOD OF PRODUCING SAME

(75) Inventor: Richard Rateick, Jr., South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 105 days.

(21) Appl. No.: 11/635,638

(22) Filed: Dec. 8, 2006

(65) Prior Publication Data

US 2008/0134878 A1 Jun. 12, 2008

(51) Int. Cl.
*F04B 1/12* (2006.01)
*F01B 3/00* (2006.01)
*F16J 1/02* (2006.01)

(52) U.S. Cl. ...................................... 92/172; 219/121.6

(58) Field of Classification Search .................. 92/172, 92/155; 219/121.6; 29/888.048
See application file for complete search history.

(56) References Cited

U.S. PATENT DOCUMENTS 3,080,854 A 3/1963 Wiggermann
4,007,663 A * 2/1977 Nagatomo et al. ............ 91/499
4,125,926 A 11/1978 Gale et al.
4,264,380 A 4/1981 Rose et al.
4,593,776 A 6/1986 Salesky et al.
4,918,806 A 4/1990 Watanabe et al.
5,728,475 A 3/1998 Rateick, Jr.
5,809,863 A 9/1998 Tominaga et al.
5,813,315 A * 9/1998 Kristensen et al. ............. 92/71
5,850,775 A 12/1998 Stiefel et al.
5,890,402 A 4/1999 Nedbal
5,947,003 A 9/1999 Jepsen et al.
6,284,067 B1 9/2001 Schwartz et al.
6,402,438 B1 6/2002 Boyer
6,425,314 B1 * 7/2002 Kleinedler et al. ............. 92/71
6,644,936 B1 * 11/2003 Muta ........................... 92/158
6,802,916 B2 10/2004 Rateick, Jr. et al.
6,913,038 B2 * 7/2005 Suzuki ........................ 417/269
7,025,182 B2 4/2006 Rateick, Jr. et al.
2002/0014208 A1 2/2002 Roberts et al.

(Continued)

FOREIGN PATENT DOCUMENTS

DE 3502144 8/1985

OTHER PUBLICATIONS

EP Search Report, EP 07122322.6 dated Apr. 16, 2008.

(Continued)

*Primary Examiner*—Thomas E Lazo
(74) *Attorney, Agent, or Firm*—Ingrassia, Fisher & Lorenz, P.C.

(57) ABSTRACT

A method of producing a piston that involves providing a piston body formed of a first material, the piston body having a cylindrical portion having a diameter, a rounded end, and a neck connecting the rounded end to the cylindrical portion and having a diameter less than the diameter of the piston body, cladding a portion of the cylindrical portion with a first tool steel layer, cladding a portion of the rounded end with a second tool steel layer spaced from the first tool steel layer, heat treating the piston body and nitriding the first and second tool steel layers. Also a piston (10) having first (18) and second (22) nitrided, tool steel clad portions.

19 Claims, 2 Drawing Sheets

U.S. PATENT DOCUMENTS

| | | | |
|---|---|---|---|
| 2002/0081208 | A1 | 6/2002 | Thompson et al. |
| 2003/0063980 | A1 | 4/2003 | Doll |

OTHER PUBLICATIONS

Wang, S. H., Chen, J. Y., Xue, L, "A Study of the Abrasive Wear Behaviour of Laser-Clad Tool Steel Coatings," *Surface & Coatings Technology* 200 (2006) 3446-3458, (available online at www.sciencedirect.com Dec. 15, 2004).

Chen, J. Y., Wang, S. H., Xue, L., "Microstructure and Process Induced Residual Stresses of Laser Clad CPM-9V and CPM-10V Tool Steels," Proceedings of the 3rd International Surface Engineering Congress, Aug. 2-4, 2004, 155-161.

Crucible Service Centers Tool Steel and Specialty Alloy Selector, Nov. 20, 2006, www.crucibleservice.com/eselector/prodbyapp/tooldie/cpm10vt.html.

* cited by examiner

CLADDED AXIAL MOTOR/PUMP PISTON AND METHOD OF PRODUCING SAME

FIELD OF THE INVENTION

The present invention is directed toward a cladded piston for use in an axial pump/motor and toward a method of producing the same, and more specifically, toward a piston for use in an axial pump/motor having a body formed of a first material and having first and second surface hardened, cladded tool steel layers formed thereon and toward a method of producing same.

BACKGROUND OF THE INVENTION

Fluid transfer devices are known that operate in a first direction as a pump and in a second direction as a motor. These devices may comprise a housing within which a rotor rotates with respect to a port plate and a cam plate angled with respect to the rotor's axis of rotation. The rotor includes one or more bores (generally an odd number) each for receiving a piston. One end of each piston held in contact with the cam plate. As the rotor rotates with respect to the housing, each piston moves axially with respect to the rotor and the port plate.

The port plate includes a fluid inlet through which a fluid enters the housing when a piston aligned with the fluid inlet moves away from the port plate and a fluid outlet through which fluid exits the housing when a piston aligned with the fluid outlet moves toward the port plate. When the rotor is connected to a source of motive power, the rotation of the rotor causes the pistons to draw fluid from the inlet and expel fluid through the outlet; when operated in this manner, the fluid transfer device is referred to as an axial piston pump. When fluid is applied under pressure to the fluid inlet and drawn from the fluid outlet at a lower pressure, the rotor is caused to turn by the pressure difference; when operated in this manner, the fluid transfer device is referred to as a hydraulic motor. Thus "axial piston pump" and "hydraulic motor" may refer to the same fluid transfer device, depending on the what is making the rotor turn. Such devices are disclosed, for example, in U.S. Pat. No. 5,809,863 to Tominaga and in U.S. Pat. No. 5,850,775 to Stiefel, the disclosures of which are hereby incorporated by reference.

Friction develops between the moving pistons and the rotor cylinders in which they are housed. Therefore, it is known to form the pistons of a wear resistant tool steel. One suitable tool steel that has been used with satisfactory results is a vanadium containing material available from the Crucible Materials Corporation of Syracuse, N.Y. under the designation CPM 10V. In use, a piston formed entirely of CPM 10V is heat treated and then surface hardened using a nitriding process to increase the piston's wear resistance. Such pistons perform satisfactorily in many environments. For various reasons, including improved machinability, however, the sulfur content of CPM 10V has recently been increased from about 0.07 percent to about 0.14 percent. It has been found that this higher level of sulfur adversely affects the fatigue strength of pistons formed from this material. For many applications, it is not commercially practicable to obtain an alloy equivalent to the old formulation of CPM 10V.

SUMMARY OF THE INVENTION

This and other problems are addressed by the present invention which comprises, in a first embodiment, a piston that includes a cylindrical portion formed of a first material, a rounded end and a neck connecting the rounded end to the cylindrical portion having a diameter less than the diameter of the cylindrical portion. A first laser cladded, surface hardened layer of tool steel covers a portion of the cylindrical portion and a second laser cladded, surface hardened layer of tool steel covers a portion of the rounded end such that the second cladded layer is spaced from the first cladded layer.

Another aspect of the invention comprises a method of producing a piston starting with a piston body formed of a first material and having a cylindrical portion, a rounded end and a neck connecting the rounded end to the cylindrical portion. The method involves cladding a portion of the cylindrical portion with a first tool steel layer, cladding a portion of the rounded end with a second tool steel layer spaced from the first tool steel layer, heat treating the piston body, and nitriding the first and second tool steel layers.

BRIEF DESCRIPTION OF THE DRAWINGS

These and other aspects and features of embodiments of the present invention will be better understood after a reading of the following detailed description in connection with the attached drawings wherein.

DETAILED DESCRIPTION

Figure 1:
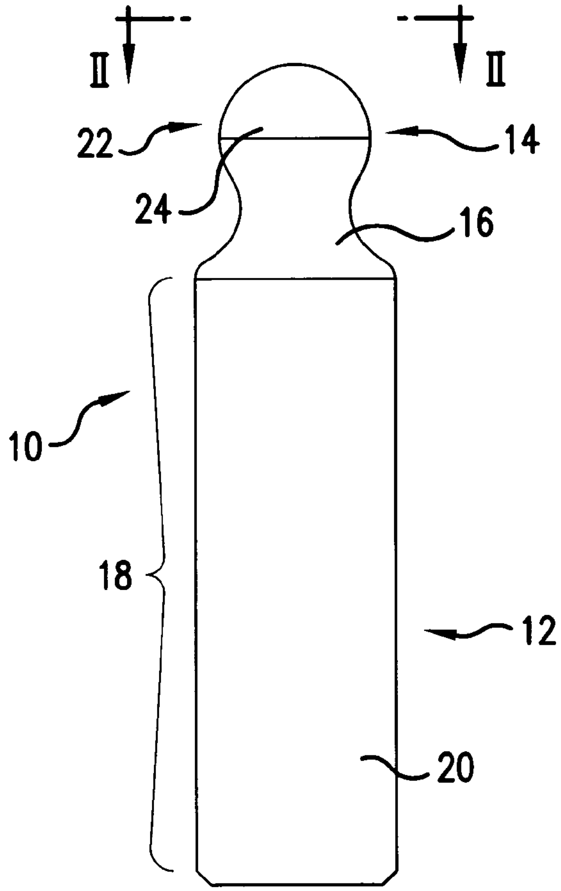
FIG. 1 is a side elevational view of a piston according to an embodiment of the present invention.
Figure 2:
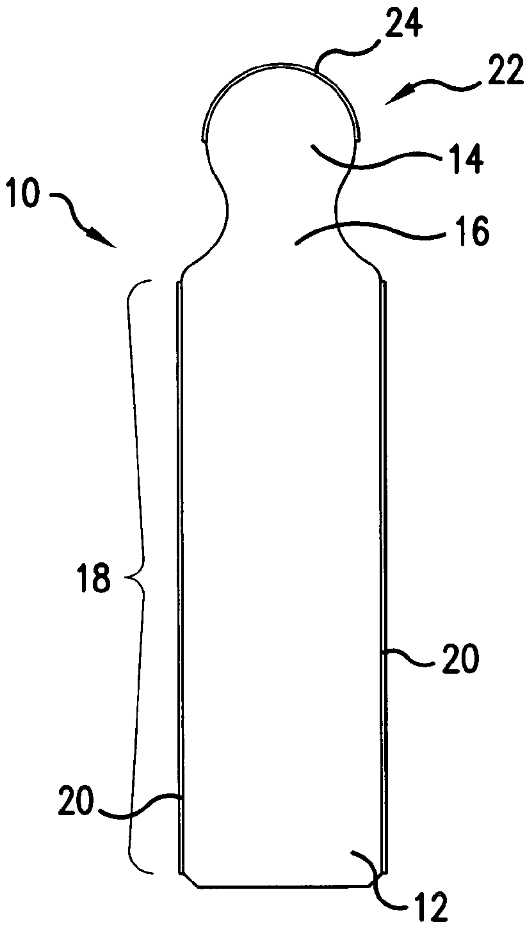
FIG. 2 is a sectional elevational view taken in the direction of line II-II in FIG. 1.
Figure 3:
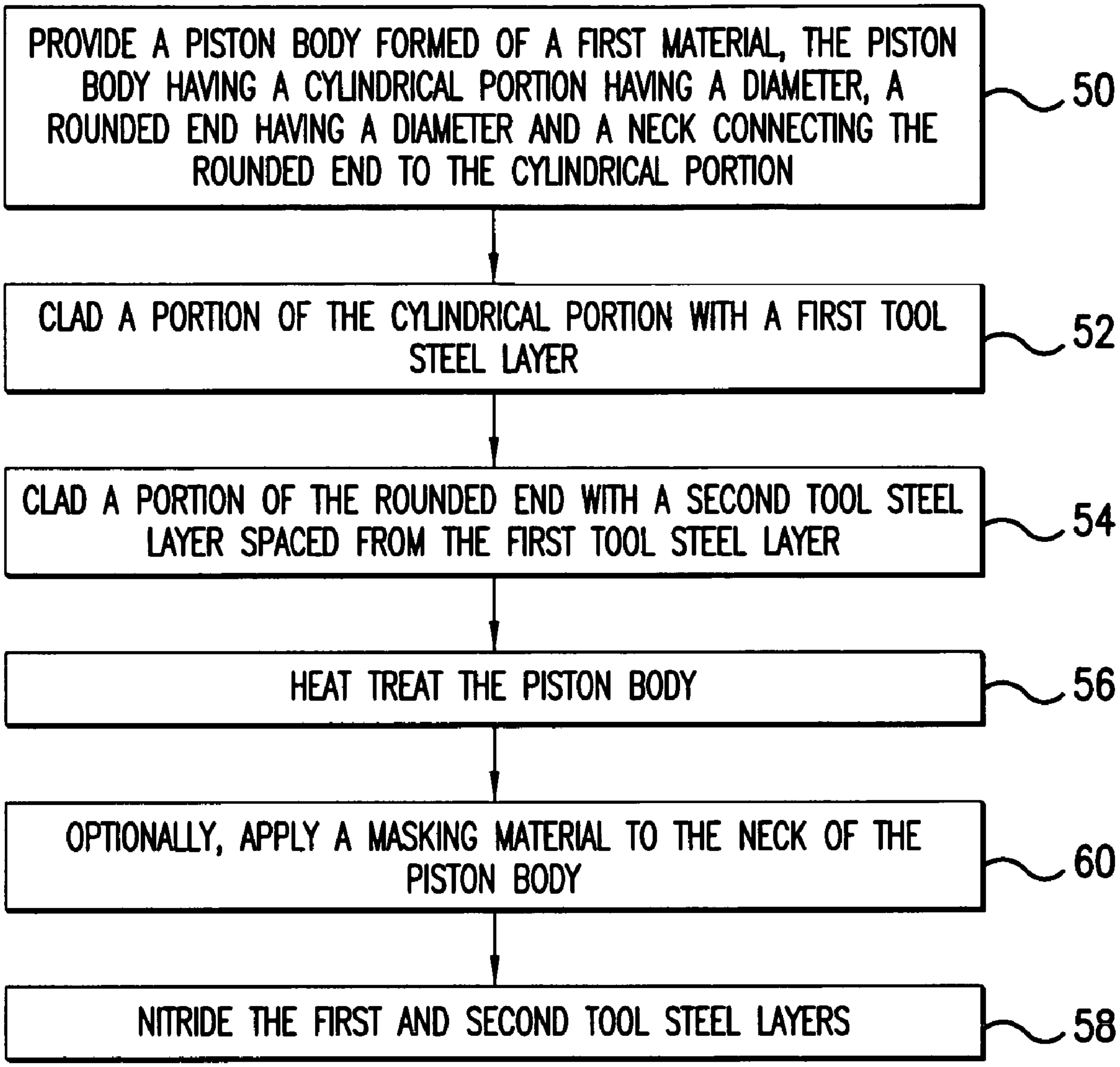
FIG. 3 is a flow chart illustrating a method of cladding a piston according to an embodiment of the present invention.

Referring now to the drawings, wherein the showings are for the purpose of illustrating preferred embodiments of the invention only and not for the purpose of limiting same, FIG. 1 illustrates a piston 10 comprising a cylindrical body portion 12, a rounded end portion 14 and a neck 16 connecting body portion 12 and end portion 14. The widest portion of the rounded end portion 14 is about the same as or somewhat smaller than the diameter of the cylindrical body portion 12, and the neck 16 has a diameter less than the diameter of the cylindrical body portion 12. Piston 10 may be formed of a stainless steel such as AISI 410 or 17-4 PH.

A first portion 18 of cylindrical body portion 12 is laser clad with a first layer 20 of tool steel while a second portion 22 of rounded end portion 14 is laser clad with a second layer 24 of tool steel. Generally preferred tool steels are AISI A-11 tool steels and in particular such tool steels when formed by a powder process. The presently preferred tool steel comprises CPM 10V which presently has a sulfur content of about 0.14 percent. AISI A-11 tool steels having sulfur levels about the 0.07 percent level previously found in CPM 10V steel may also be satisfactorily used.

The cladding layers are preferably at least about 0.030 inches and no more than about 0.150 inches thick and are not shown to scale in the Figures. Thus clad, the piston 10 is rough machined to a desired shape. In addition to being laser clad, the first and second layers are also nitrided using a suitable nitriding process to improve the wear resistance of these layers. The neck 16 may optionally be masked to protect it from the nitriding process. One method of masking the neck is to cover it with a layer of electrodeposited copper (not shown) before the nitriding process and electrochemically remove the copper after the nitriding of the first and second layers 20, 24 is completed.

A method of forming a piston according to an embodiment of the present invention involves a step 50 of providing a piston body formed of a first material, where the piston body has a cylindrical portion, a rounded end and a neck connecting the rounded end to the cylindrical portion, a step 52 of cladding a portion of the cylindrical portion with a first tool steel layer, a step 54 of cladding a portion of the rounded end with a second tool steel layer spaced from the first tool steel layer, a step 56 of heat treating the piston body, and a step 58 of nitriding the first and second tool steel layers. Optionally, the neck of the piston body can be masked with a layer of copper at a step 60 before the nitriding step 58 to prevent the exposed stainless steel neck 14 from being nitrided. Of course, if the optional masking step is performed, it will be necessary to strip the masking material from the neck portion of the piston body after the nitriding steps.

Formed primarily of stainless steel, piston 10 has a greater fatigue strength than a solid body of tool steel such as CPM 10V. At the same time, the nitrided, laser clad layers 20, 24 impart to piston 10 a wear resistance similar to that of wear resistant tool steels. In this manner, commonly available materials can be used to provide a piston with properties superior to those of pistons formed entirely of tool steel.

The present invention has been described herein in terms of a preferred embodiment. Additions and modifications to the disclosed piston and piston forming method will become apparent to those skilled in the relevant arts upon a reading of the foregoing disclosure. It is intended that all such obvious modifications and additions form a part of the present invention to the extent they fall within the scope of the several claims appended hereto.

What is claimed is:

1. A piston comprising:

a cylindrical portion formed of a first material and having a diameter;

a rounded end;

a neck connecting said rounded end to said cylindrical portion and having a diameter less than the diameter of said cylindrical portion; and a first laser cladded, surface hardened layer of tool steel covering a portion of said cylindrical portion and a second laser cladded, surface hardened layer of tool steel covering a portion of said rounded end, said second cladded layer being spaced from said first cladded layer.

2. The piston of claim 1 wherein said first material comprises stainless steel.

3. The piston of claim 2 wherein said neck comprises an exposed portion of said stainless steel.

4. The piston of claim 1 wherein said first cladded layer and said second cladded layer are nitrided.

5. The piston of claim 1 wherein said first cladded layer has a thickness of at least 0.030 inches.

6. The piston of claim 1 wherein said first and second cladded layers of tool steel comprise an AISI A-11 tool steel.

7. The piston of claim 6 wherein said first and second cladded layers of tool steel comprise a powdered metal AISI A-11 tool steel.

8. The piston of claim 7 wherein said first and second cladded layers of tool steel have a sulfur content of about 0.14 percent.

9. The piston of claim 6 wherein said first and second cladded layers of tool steel have a sulfur content of about 0.14 percent.

10. The piston of claim 1 wherein said first and second cladded layers of tool steel have a sulfur content of greater than 0.07 percent.

11. The piston of claim 1 wherein said first and second cladded layers of tool steel have a sulfur content of about 0.14 percent.

12. A method of producing a piston comprising the steps of:

providing a piston body formed of a first material, the piston body having a cylindrical portion having a diameter, a rounded end, and a neck connecting the rounded end to the cylindrical portion and having a diameter less than the diameter of the piston body;

cladding a portion of the cylindrical portion with a first tool steel layer;

cladding a portion of the rounded end with a second tool steel layer spaced from the first tool steel layer;

heat treating the piston body; and nitriding the first and second tool steel layers.

13. The method of claim 12 including the additional steps of:

applying a masking material to the neck of the piston body before said step of nitriding the first and second tool steel layers; and removing the masking material after said step of nitriding the first and second tool steel layers.

14. The method of claim 12 wherein said step of providing a piston body comprises the step of providing a stainless steel piston body and wherein said step of cladding a portion of the cylindrical portion with a second layer of tool steel comprises cladding a portion of the cylindrical portion with an AISI A-11 tool steel.

15. The method of claim 14 wherein said step of cladding a portion of the cylindrical portion with an AISI A-11 tool steel comprises the step of laser cladding a portion of the cylindrical portion with an AISI A-11 tool steel having a sulfur content greater than 0.07 percent.

16. The method of claim 14 wherein said step of cladding a portion of the cylindrical portion with an AISI A-11 tool steel comprises the step of laser cladding a portion of the cylindrical portion with an AISI A-11 tool steel having a sulfur content of about 0.14 percent.

17. The method of claim 14 wherein said step of cladding a portion of the cylindrical portion with an AISI A-11 tool steel comprises the step of laser cladding a portion of the cylindrical portion with a powdered metal AISI A-11 tool steel having a sulfur content of about 0.14 percent.

18. The method of claim 12 wherein said step of cladding a portion of the cylindrical portion with a tool steel comprises a step of laser cladding a portion of the cylindrical portion with a tool steel.

19. The method of claim 18 wherein said step of cladding a portion of the cylindrical body with a tool steel comprises the step of laser cladding a portion of the cylindrical body with a tool steel at least about 0.030 inches thick.

* * * * *